United States Patent [19]

Keller

[11] Patent Number: 5,509,681
[45] Date of Patent: Apr. 23, 1996

[54] KIT AND METHOD FOR CONVERTING A WHEELBARROW INTO A GARDEN CART

[76] Inventor: Louis D. Keller, P.O. Box 5336, North Muskegon, Mich. 49445

[21] Appl. No.: 367,436

[22] Filed: Dec. 30, 1994

[51] Int. Cl.$^6$ ........................................................ B62D 5/00
[52] U.S. Cl. ................................ 280/415.1; 280/47.18
[58] Field of Search ................................ 280/30, 415.1, 280/504, 653, 656, 659, 47.18, 47.31, 292, 204, 7.12

[56] References Cited

U.S. PATENT DOCUMENTS

| | | | |
|---|---|---|---|
| 3,690,692 | 9/1972 | Florian et al. | 280/654 |
| 3,751,058 | 8/1973 | Larsen | 280/30 |
| 3,784,230 | 1/1974 | Worrall, Jr. | 280/491 |
| 3,936,070 | 2/1976 | Owings | 280/47.18 |
| 3,977,477 | 8/1976 | Wise | 172/246 |
| 4,052,079 | 10/1977 | Lehman | 280/47.2 |
| 4,090,457 | 5/1978 | Roberts | 111/82 |
| 4,155,678 | 5/1979 | Lehman et al. | 414/483 |
| 4,269,026 | 5/1981 | Bulle et al. | 59/82 |
| 4,281,950 | 8/1981 | Lehman et al. | 410/3 |
| 4,592,564 | 6/1986 | Warnock et al. | 280/292 X |
| 4,729,574 | 3/1988 | Tipke | 280/415.1 |
| 4,738,857 | 4/1988 | Conrad | 280/47.26 |
| 4,740,008 | 4/1988 | Johnson | 280/47.5 |
| 4,767,128 | 8/1988 | Terhune | 280/47.2 |
| 4,789,171 | 12/1988 | Porter | 280/47.18 |
| 5,031,926 | 7/1991 | Wannamaker | 280/47.2 |
| 5,087,061 | 2/1992 | Wallace | 280/30 |
| 5,106,113 | 4/1992 | Piacentini | 280/47.21 |
| 5,215,321 | 6/1993 | Ljungberg | 280/47.131 |
| 5,244,221 | 9/1993 | Ward | 280/79.7 |
| 5,285,936 | 2/1994 | Matricardi, Jr. | 224/42.01 |

FOREIGN PATENT DOCUMENTS

| | | | |
|---|---|---|---|
| 0527075 | 7/1956 | Canada | 280/47.31 |
| 0129134 | 8/1950 | Sweden | 280/47.31 |
| 0889440 | 2/1962 | United Kingdom | 280/653 |
| 2046674 | 11/1980 | United Kingdom | 280/47.31 |

Primary Examiner—Margaret A. Focarino
Assistant Examiner—Victor E. Johnson
Attorney, Agent, or Firm—Varnum, Riddering, Schmidt & Howlett

[57] ABSTRACT

A kit for converting a wheelbarrow for use as a towed garden cart is especially suited for wheelbarrows of the type comprising a pan supported on diverging beams, and a brace between forward ends of the beams, a forward wheel mounted to the beams adjacent the brace and a pair of depending legs mounted to the beams behind the forward wheel. The kit comprises rear wheel assemblies mounted to each of the depending legs and a front hitch plate releasably attached to the forward ends of the beams adjacent the brace and having a forwardly extending tongue adapted to connect to a hitch on a towing vehicle. The hitch plate has a riser received behind the brace and a return flange forming a channel to receive laterally extending support members which rest atop the beam forward ends. The rear wheel assembly preferably comprises an axle tube adapted to mount to each of the rear legs and axles bearing wheels releasably mounted within each of the axle tubes.

17 Claims, 4 Drawing Sheets

5,509,681

KIT AND METHOD FOR CONVERTING A WHEELBARROW INTO A GARDEN CART

BACKGROUND OF THE INVENTION

Field of the Invention

This invention relates to garden carts and more particularly to methods and kits for converting standard wheelbarrows into carts which may be towed forwardly by a garden tractor.

State of the Prior Art

Lehman et al., U.S. Pat. Nos. 4,281,950 issued Aug. 4, 1981; 4,155,678 issued May 22, 1979, and Lehman U.S. Pat. No. 4,052,079 issued Oct. 4, 1977, disclose the mounting of a wheelbarrow onto a dolly or other small sets of wheels upon which the wheelbarrow can ride when the dolly is connected to a tractor or riding lawn mower.

Wallace, U.S. Pat. No. 5,087,061, issued Feb. 11, 1992, discloses a wheelbarrow which may be converted into a garden trailer having two forward wheels and foldable handles. A tow bar extends rearwardly from an axle upon which the wheels are mounted and an extension for the tow bar stows underneath the wheelbarrow pan. To convert the wheelbarrow to a garden cart, the handles are folded and the tow bar extension is removed from under the pan and affixed to the tow bar. The tow bar extension can then be attached to a tractor so that the wheelbarrow can be pulled facing rearwardly. However, if one desires to alternate between use as a wheelbarrow and use, a tractor, a complete conversion must be effected.

Wannamaker, U.S. Pat. No. 5,031,926, issued Jul. 16, 1991, discloses a wheelbarrow conversion kit for utilizing a wheelbarrow as a garden tractor. The conversion kit comprises an elongated frame rail rotatably mounting a wheel at each end thereof and an elongate tongue orthogonally mounted to the frame through a removable pin. The frame rail is secured to or adjacent the legs of the wheelbarrow through screws which extend through the legs and into the frame. The elongate tongue can be coupled to a coupling hitch of an associated tractor vehicle.

SUMMARY OF INVENTION

According to the invention, a kit for converting a wheelbarrow to a towed garden cart comprises a pair of rear wheel assemblies, each adapted to be mounted to one of the depending legs of the wheelbarrow and a front hitch plate adapted to be releasably attached to beams adjacent a brace and having a forwardly extending tongue adapted to be connected to a towing vehicle. The kit is adapted to convert a standard wheelbarrow having a pan supported on and secured to a pair of spaced apart beams, a brace between forward ends of the beams, a forward wheel mounted to the beams adjacent the brace and a pair of depending legs mounted to the beams behind the forward wheel.

The hitch plate preferably comprises a riser extending upwardly from the tongue and received behind the brace and between the forward ends of the beam. Preferably, a support member extends outwardly of the riser and is received atop the beams forward ends. To this end, the riser has a return flange forming a channel and the support member comprises a rod received within the riser channel. The rod can be threaded or knurled to resist slippage of the rod in the riser channel.

In a preferred embodiment of the invention, the rear wheel assembly comprises an axle tube mounted to one of the depending legs, an axle received in the tube and a rear wheel rotatably mounted on the axle. Preferably, a shim is adapted to be mounted between the axle tube and the depending leg to adjust the toe-in angle of the rear wheel with respect to the wheelbarrow. The shim comprises a cylinder having a transverse groove for receiving the axle tube. Bolts extend from the axle tube past the depending leg and are received within a mounting plate positioned on an opposite side of the depending leg for mounting the axle tube to the depending leg. Nuts secure the bolts to the axle tubes and the depending legs.

Further, according to the invention, a method for converting a wheelbarrow to a towable garden cart comprises the steps of mounting a rear wheel assembly having a wheel to each of the depending legs of a wheelbarrow in a position to support the legs on the wheels and releasably attaching a front hitch plate having a forwardly extending tongue to at least one of the beams and brace. The tongue has a hitch connection for a towing vehicle. The rear wheel assembly preferably comprises an axle tube and an axle mounting the rear wheel and the step of mounting the rear wheel assembly comprises the step of mounting the axle tube to each of the rear legs of the wheelbarrow and mounting each of the rear wheels to one end of an axle, passing each axle through a corresponding axle tube and releasably affixing a fastener to an opposite end of each axle to hold the axles within the axle tubes.

BRIEF DESCRIPTION OF THE DRAWINGS

The invention will now be described with reference to the drawings wherein.

DETAILED DESCRIPTION

Figure 1:
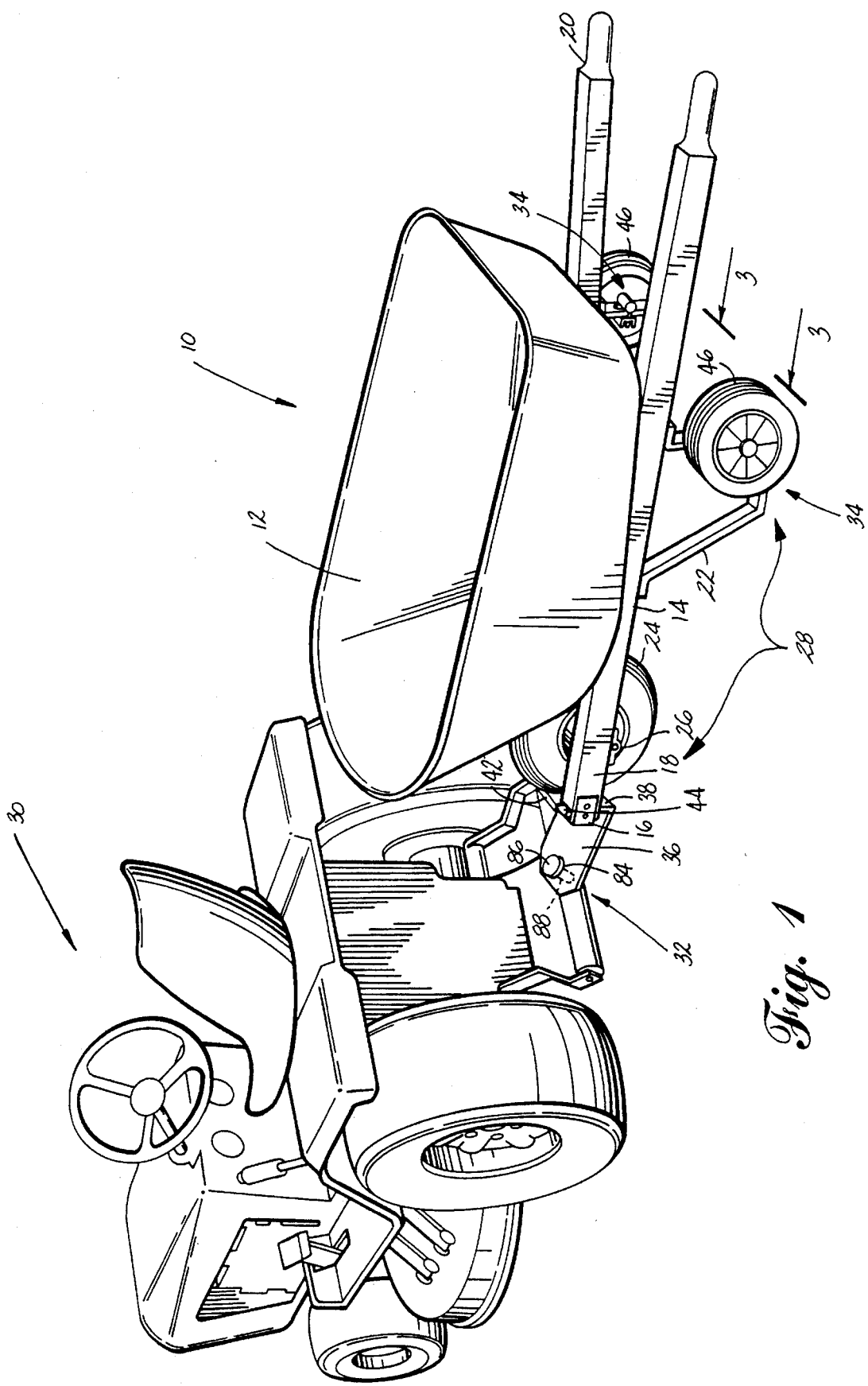
FIG. 1 is a perspective view of a wheelbarrow which has been converted to function as a trailer in a manner according to the invention.

Referring to FIG. 1, a standard wheelbarrow 10 comprises a pan 12 supported upon diverging beams 14. A laterally disposed brace 16 connects forward ends 18 of the beams 14. The opposite ends of the beams 14 form handles 20. U-shaped legs 22 depend from the beams 14 adjacent the handles 20. A forward wheel 24 is supported on an axle 26 between the beam forward ends 18.

A conversion kit 28 to convert the wheelbarrow into a vehicle which can be drawn by a tractor 30 comprises a front hitch plate 32 attached to the brace 16 and a pair of rear wheel assemblies 34 attached to the legs 22.

Figure 2:
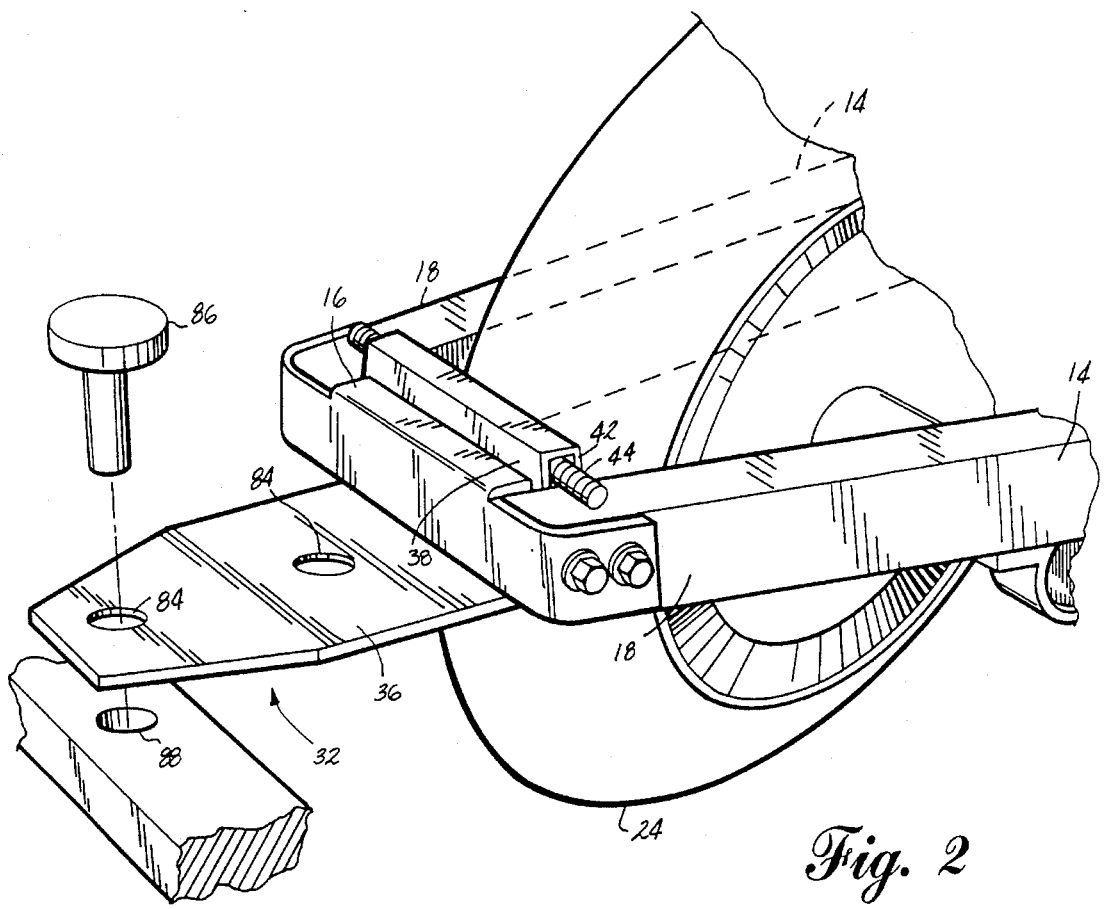
FIG. 2 is a perspective view of a forward portion of the wheelbarrow of FIG. 1 illustrating a detachable hitch plate.

Turning to FIG. 2, the hitch plate 32 comprises a forwardly extending tongue 36 and a riser 38 extending normal to and upwardly from a rear edge of the tongue 36. The riser 38 is received between the beam forward ends 18 behind the brace 16. The top of the riser 38 is folded rearwardly and downwardly at a return flange 42 to form a channel which receives a threaded or knurled rod 44. The rod 44 rests upon the beam forward ends 18 to hold the hitch plate 32 securely thereto. The threading or knurling on rod 44 functions to give the surface of the rod a rough texture to resist slippage of the rod 44 from the riser channel. The hitch plate 32 can thus be easily detached from the wheelbarrow 10 by sliding the rod 44 out of the return flange 42 or by lifting the tongue 36 upwardly through the beams 14. A pair of linchpin holes 84 are formed in the hitch plate tongue 36 for attaching the tongue 36 to a towing vehicle through a linchpin 86, for example. An extension plate (not shown) can also be bolted to the two holes 84 to extend the length of the tongue 36 if desirable.

Figure 3:
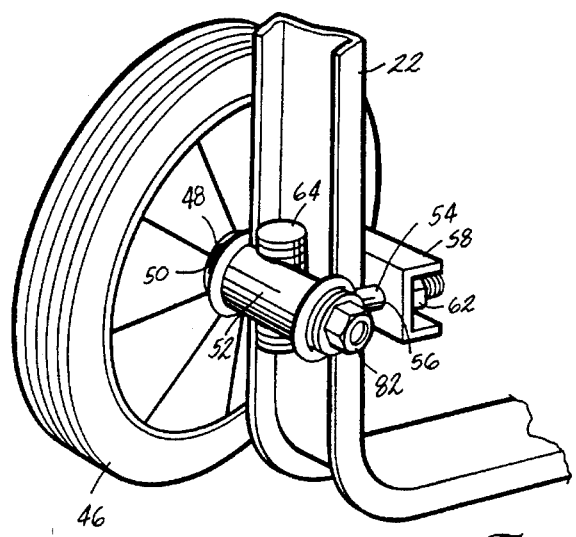
FIG. 3 is a perspective view of an assembly for mounting a wheel to a rear depending leg of the wheelbarrow of FIG. 1.

Turning to FIG. 3, each rear wheel assembly 34 comprises a wheel 46 mounted on an axle 48. The wheel 46 can be the same size as the forward wheel 24 or smaller, as illustrated. The axle 48 extends through an aperture 50 in the wheel 46 and into an axle tube 52 mounted to the wheelbarrow leg 22. To mount the axle tube 52 to the wheelbarrow leg 22, a pair of eye bolts 54 encircle the axle tube 52 and extend forwardly past the wheelbarrow leg 22 to be received within apertures 56 in a U-shaped plate 58. Alternatively, a tube (not shown) can be used instead of a U-shaped plate. A washer 60 and nut 62 on each eye bolt 54 secures the eye bolt 54 to the forward tube 58 and thus the eye bolts 54 hold the axle tube 52 securely to the wheelbarrow leg 22. A shim 64 between the axle tube 52 and the wheelbarrow leg 22 adjusts the toe-in angle of the wheels 46.

Figure 4:
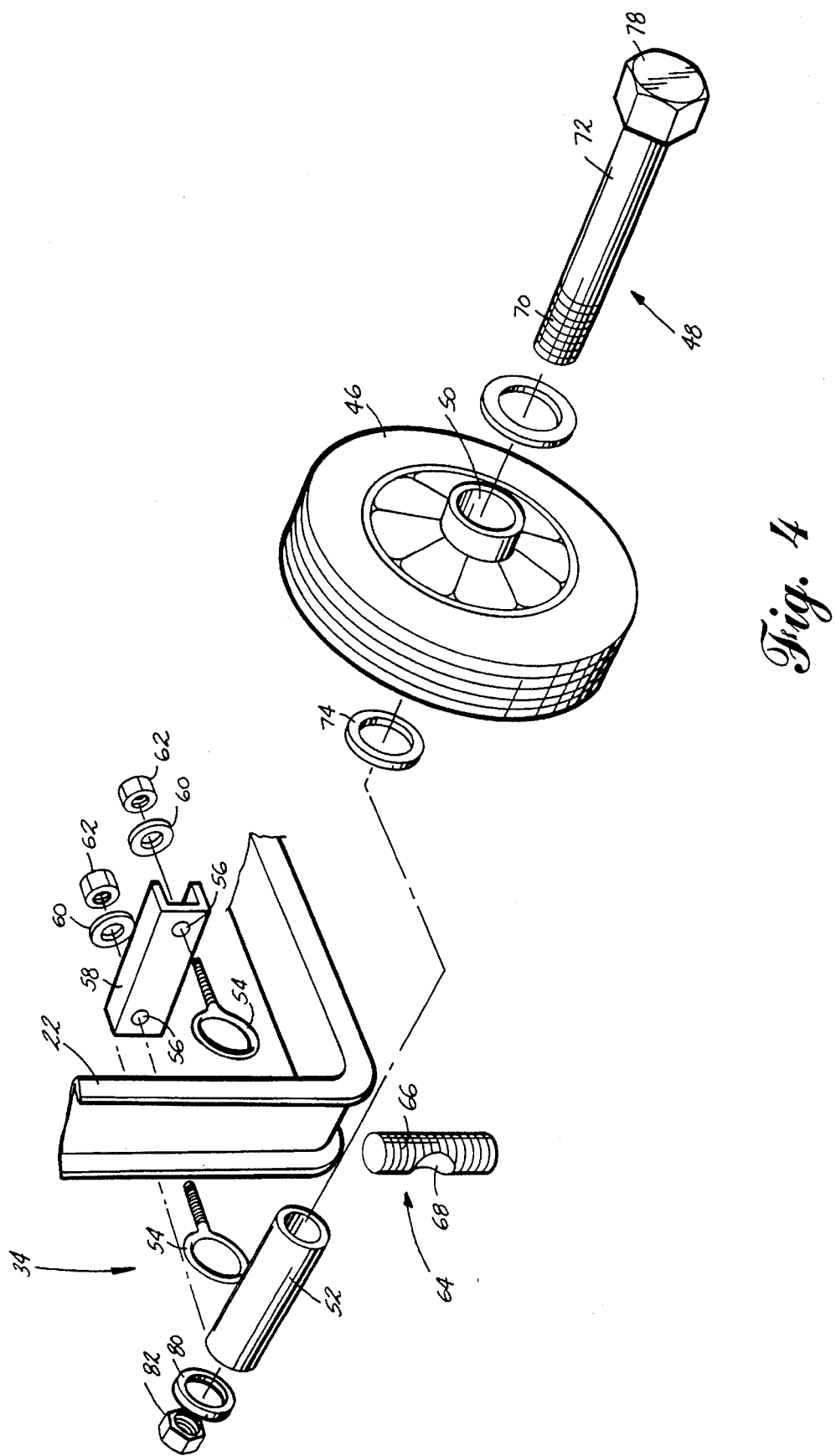
FIG. 4 is an exploded view of the assembly of FIG. 3.

FIG. 4 illustrates the details of the shim 64 and also of the axle 48. The shim 64 is cylindrical and oriented vertically. Threads 66 or other friction enhancing protuberances on its outer surface engage the wheelbarrow leg 22 to aid in fixing the vertical position of the wheel assembly 34 thereon. A shallow transverse grove 68 has a complementary shape to receive the axle tube 52. The shallow transverse groove 68 can be eliminated.

The axle 48 has a threaded first end 70 and an unthreaded second end 72. A bolt head 78 is provided on the axle second end 72 opposite the threaded end 70. A washer 73 has an opening sized to slide on the unthreaded end 72 of the axle 48 and abuts the head 78. A washer 74 of larger diameter than the axle tube 52 is received over the axle first end 70 and abuts a hub of wheel 46. The axle second end 72 is received within the wheel aperture 50 so that the wheel 46 is loosely trapped between the washer 74 and the washer 73 adjacent the bolt head 78. The axle first end 70 is received through the axle tube 52 and is held thereon by a washer 80 and lock nut 82. The lock nut 82 can be a wing nut for easy mounting of the axle 48 on the tube 52.

Turning also to FIG. 1, the conversion kit 28 quickly converts the wheelbarrow 10 for use as a garden cart. The first time the conversion kit 28 is used with the wheelbarrow 10, the axle tubes 52 must be mounted on the wheelbarrow legs 22 and adjusted to provide proper orientation of the wheels 46. However, the axle tube 52 need not be removed from the wheelbarrow leg 22 to reconvert the wheelbarrow for use as a standard wheelbarrow. Thus, after the axle tubes 52 are installed and adjusted, conversion of the wheelbarrow 10 for use as a garden cart merely requires the axles 48 to be passed through the wheels 46 and axle tubes 52. To ease this assembly, the lock nut 82 can be of the wing nut or other hand tightenable variety. The hitch plate rod 44 is inserted into the hitch plate return flange 42 and the hitch plate 32 is positioned behind the wheelbarrow forward brace 16. The conversion is then complete.

Linchpin holes 84 are provided through the hitch plate tongue 36 (see also FIG. 2) so that a linchpin 86 can quickly attach the hitch plate 32 to a tractor hitch 88 on the tractor 30. Several holes 84 are provided to extend the tongue 36 if necessary by a separate hitch plate (not shown). Other equivalent hitching interconnections such as a bull hitch, etc., can be substituted for the linchpin 86 and holes 84. Contents in the wheelbarrow pan 10 may be dumped in a standard fashion when the hitch plate 32 is removed from the wheelbarrow 10. The hitch plate 32 is easily and quickly removed from the wheelbarrow 10 so that it can be tipped forwardly onto front brace 16 for emptying contents from the pan 12.

Figure 5:
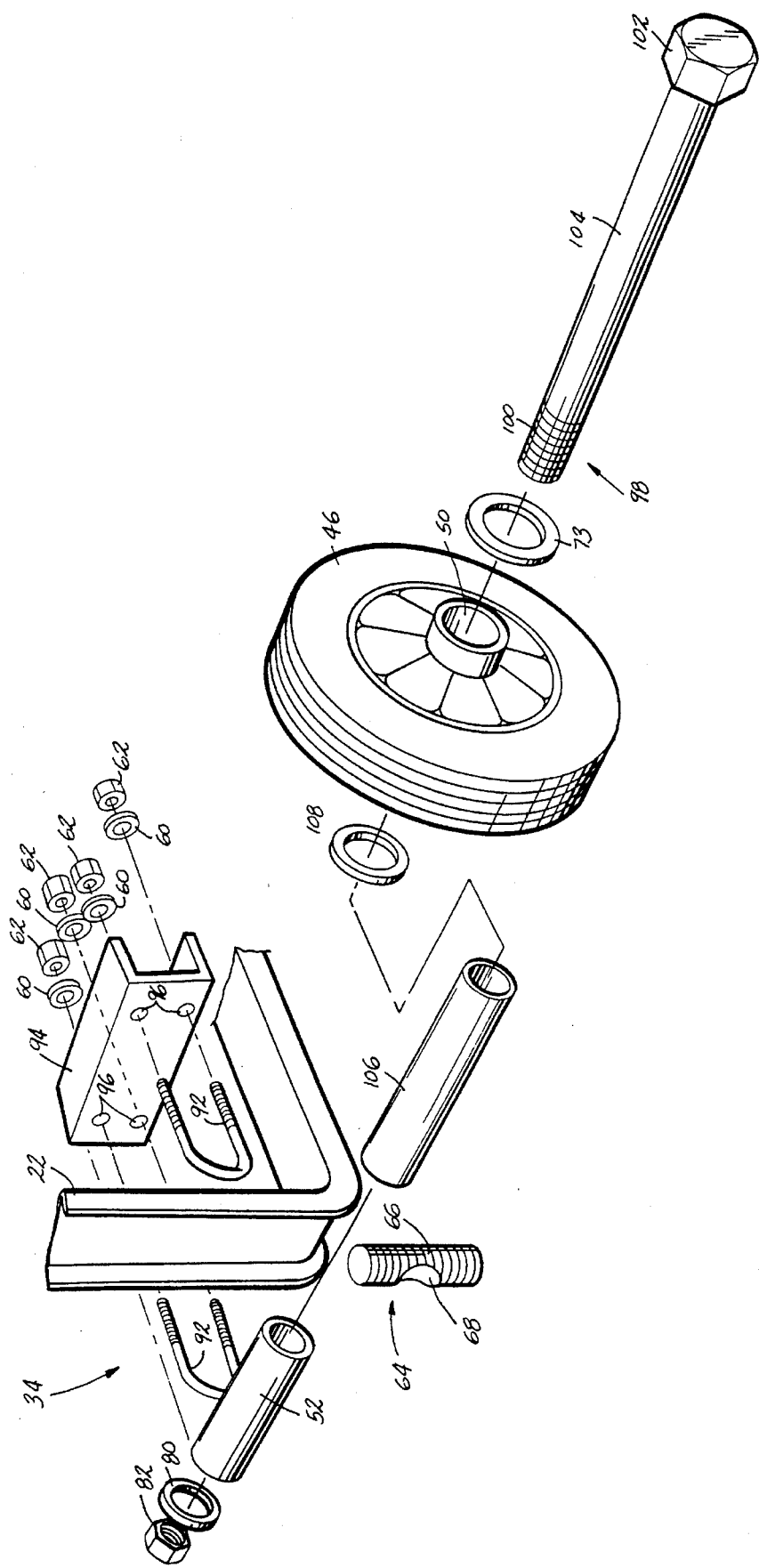
FIG. 5 is an exploded view, like FIG. 4, of a second embodiment of the invention.

Referring now to FIG. 5, there is shown a second embodiment of the invention in which like numerals have been used to describe like parts. In this embodiment, the axle is extended outwardly of the legs 22 to provide more lateral stability to the wheelbarrow in the case where a more robust use is contemplated. A pair of U-bolts 92 extend around the axle tube 52 and through holes 96 in a U-shaped channel 94. The U-bolts are secured to the channel through nuts 62. An axle 98 is considerably longer than the axle 48 and has a relatively short threaded end 100, a head 102 and a shank 104. A spacer tube 106 is positioned on the shank portion 104 and spaces the wheel 46 outwardly of the leg 22. A washer 108 has an aperture which slides on the shank 104 and abuts the spacer tube 106 and the hub of the wheel 46.

In operation of the embodiment illustrated in FIG. 5, the axle is threaded through the washer 73, through the aperture 50 in wheel 48, through the washer 108, through spacer tube 106 and through the axle tube 52. The washer is placed on the threaded end 100 of the axle 98 and the lock nut 82 is threaded onto the threaded end 100 of the axle 48 to secure the wheel in place.

While the invention has been particularly described in connection with a certain specific embodiment thereof, it is to be understood that this is by way of illustration and not of limitation. Reasonable variation and modification are possible within the scope of the foregoing description and drawings without departing from the scope of the invention.

What is claimed is:

1. A kit for converting a wheelbarrow for use as a towed garden cart, the wheelbarrow comprising a pan supported on and secured to a pair of spaced apart beams, a brace between forward ends of the beams, a forward wheel mounted to the beams adjacent the brace and a pair of depending legs mounted to the beams behind the forward wheel, the kit comprising:

a pair of rear wheel assemblies each having an axle and adapted to be mounted to one of the depending legs; and a front hitch plate adapted to be releasably mounted without the use of tools to the beams adjacent the brace and having a tongue extending beyond the forward ends of the beams and adapted to be connected to a towing vehicle, said hitch plate having a riser extending upwardly from said tongue and a support member extending laterally outwardly from an upper portion of said riser.

2. A kit according to claim 1 wherein the riser is adapted to be received behind the brace and between the forward ends of the beams.

3. A kit according to claim 2 wherein the support member is adapted to be suspended at its outer ends by the forward ends of the beams.

4. A kit according to claim 3 wherein the riser has a return flange forming a channel and the support member comprises a rod received longitudinally within the riser channel such that the ends of the rod extend beyond the channel.

5. A kit according to claim 4 wherein the rod is textured to resist slippage of the rod out of the riser channel.

6. A kit according to claim 1 wherein each rear wheel assembly comprises an axle tube adapted to be mounted to one of the depending legs, an axle received in the tube and a rear wheel rotatably mounted on the axle.

7. A kit according to claim 6 and further comprising a shim adapted to be mounted between the axle tube and the depending leg to adjust the toe-in angle of the rear wheel with respect to the wheelbarrow.

8. A kit according to claim 7 wherein the shim comprises a cylinder having a groove transverse to a longitudinal axis of the cylinder for receiving the axle tube.

9. A kit according to claim 8 wherein the shim is knurled to resist slippage against the depending leg.

10. A kit according to claim 7 wherein bolts extend from the axle tube past the depending leg and are received within a mounting plate positioned on an opposite side of the depending leg for mounting the axle tube to the depending leg.

11. A kit according to claim 10 wherein the mounting plate is a U-shaped channel.

12. A kit according to claim 6 wherein the axle comprises a first end and a second end, the first end receiving the wheel and the second end passing through the axle tube, and a nut secured to the second end abuts the axle tube to hold the axle securely therein.

13. A kit according to claim 6 wherein the rear wheel assembly comprises a spacer tube between the axle tube and the rear wheel for spacing the wheel outward from an associated depending leg.

14. A kit according to claim 6 wherein the hitch plate further comprises a riser extending upwardly from the tongue and adapted to be received behind the brace and between the forward ends of the beams and the riser further comprises a support member extending outwardly and adapted to be received atop the beams forward ends.

15. A kit according to claim 14 wherein the riser has a return flange forming a channel and the support member comprises a textured rod received within the riser channel.

16. A method for converting a wheelbarrow to a towable garden cart, the wheelbarrow comprising a pan supported on and secured to a pair of spaced apart beams and a brace between forward ends of the beams, a forward wheel mounted to the beams adjacent the brace and a pair of depending legs mounted to the beams behind the forward wheel, the method comprising the steps of:

mounting a rear wheel assembly having an axle and a wheel to each of the depending legs in a position to support the legs on the wheels; and inserting a front hitch plate having a forwardly extending tongue between said beams and releasably engaging said hitch plate with an upper surface of said beams, the tongue having a hitch connection for a towing vehicle.

17. A method according to claim 16 wherein the step of mounting the rear wheel assembly comprises the steps of mounting an axle tube to each of the rear legs and mounting each of the rear wheels to one end of an axle, passing each axle through a corresponding axle tube and releasably affixing a fastener to an opposite end of each axle to hold the axles within the axle tubes.

* * * * *